United States Patent [19]
Johnson

[11] 4,219,814
[45] Aug. 26, 1980

[54] SCANNING RADAR

[75] Inventor: Henry C. Johnson, Neshanic, N.J.

[73] Assignee: RCA Corporation, New York, N.Y.

[21] Appl. No.: 973,453

[22] Filed: Dec. 26, 1978

[51] Int. Cl.² ............................................. G01S 9/04
[52] U.S. Cl. .................................. 343/9 R; 343/12 R; 343/18 B; 266/86; 266/99
[58] Field of Search ................... 266/86, 99, 183; 343/9 R, 12 R, 14, 18 B

[56] References Cited

U.S. PATENT DOCUMENTS

| 3,701,518 | 10/1972 | Herff | 343/12 R X |
| 3,727,897 | 4/1973 | Bennett | 343/12 R X |
| 3,821,738 | 6/1974 | Quesinberry et al. | 343/9 R X |
| 4,044,354 | 8/1977 | Bosher et al. | 343/14 |

Primary Examiner—T. H. Tubbesing
Attorney, Agent, or Firm—Samuel Cohen; Joseph D. Lazar; Raymond E. Smiley

[57] ABSTRACT

A radar, such as a ranging radar, includes a non-scanning antenna which directs a beam of microwave energy toward and receives a return beam from a microwave reflector. A microwave reflector is mounted to a movable platform. As the platform moves, the microwave beam is scanned along a desired object. In one application, the heighth of a non-flowing material in different parts of a container is measured.

4 Claims, 3 Drawing Figures

4,219,814

SCANNING RADAR

BACKGROUND OF THE INVENTION

There are numerous applications requiring a scanning type radar system. Conventionally such scanning has been done in one of two ways. In the first way, the radar antenna may be adapted to move or pivot in a manner such as to achieve the necessary scanning. Since the antenna must be connected to the rest of the radar by a mechanical waveguide structure, a piece of articulating waveguide must be used, which is costly and periodically requires repair. Further, the waveguide "leaks" so not all energy in the waveguide produced by the radar is transmitted by the antenna and not all the return energy received at the antenna is transferred to the radar electronics. The other way of achieving antenna scanning is by the use of a phased array antenna in which the scanning occurs by electronic means. No physical movement of the antenna in a phased array radar is necessary. Phased array radar antennas, however, are very costly. Furthermore, with either scanning method, a structure positioned between the antenna and object or surface to be scanned undesirably blocks the microwave beam between the radar antenna and object.

SUMMARY OF THE INVENTION

In accordance with the invention, a radar employing a non-scanning antenna to transmit and receive a microwave beam is utilized. The radar produces signals representative of the round trip time of the beam as a function of time. A moveable microwave reflector is moved in a desired manner to direct the microwave beam along the object as desired. A means responsive to the orientation of the reflector produces signals representative of its orientation as a function of time. A means responsive to the round trip and orientation signals as a function of time produces signals representative of range or range rate at various points on the object. In accordance with one aspect of the invention, the reflector is mounted to a chute utilized to fill and distribute raw materials in a blast furnace and enables a determination of the heighth of the material surface at various locations along the surface in the blast furnace.

DETAILED DESCRIPTION OF THE PREFERRED EMBODIMENT

Figure 1:
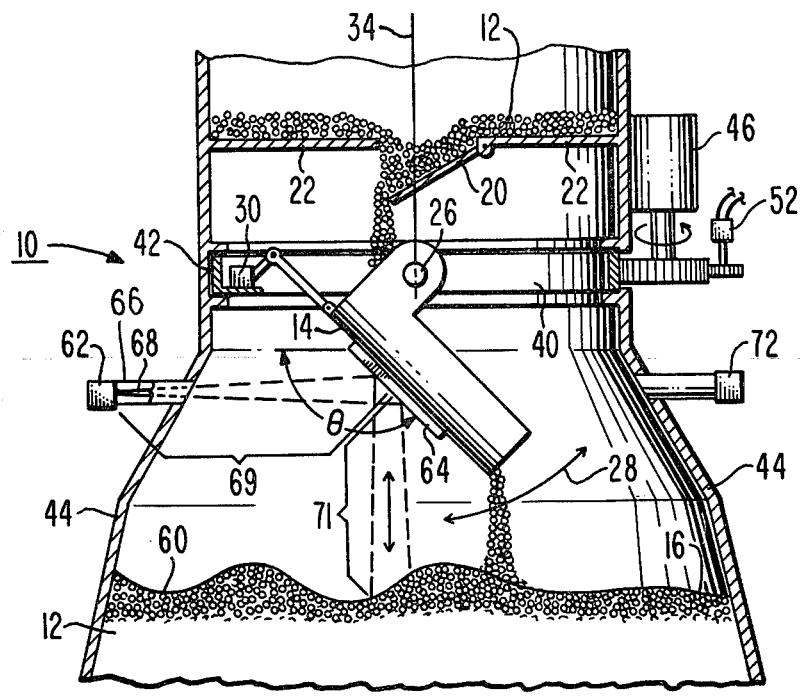
FIG. 1 is an elevation view of a blast furnace partly in cross section incorporating a scanning radar system for height measurement in accordance with the invention.
Figure 2:
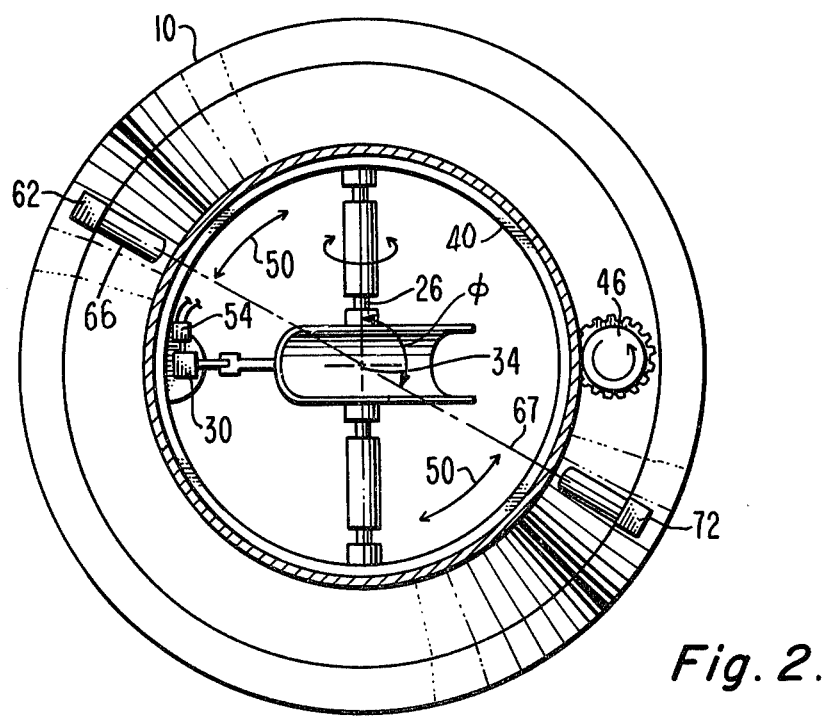
FIG. 2 is a plan view along lines 2—2 of the blast furnace of FIG. 1.

Refer now to FIGS. 1 and 2 which respectively illustrate an elevation view and a plan view of a blast furnace system of the belless type top employing the present invention. A portion of a blast furnace 10 is illustrated in cross section. The upper section of a blast furnace is generally in the shape of a truncated cone and is typically about 25 to 30 meters in height. The bottom part of the blast furnace (not shown) contains molten iron. The upper portion of the blast furnace contains burden 12. Burden is a mixture of iron ore, pellets, coke and sinter. As the process continues more and more of the burden is converted into molten iron and the remaining burden descends in the blast furnace. When sufficient molten iron is present, the blast furnace is "tapped" in a manner well known to those skilled in the art. When the blast furnace is tapped, the molten iron flows from the blast furnace allowing the burden to descend still further in the blast furnace.

A material direction chute 14 is positioned above surface 16 of burden 12. Above chute 14 is a moveable gate 20 positionable in relation to floor 22 holding additional burden 12. When gate 20 is open, burden flows onto chute 14 down the chute and then to the burden surface 16 to replace burden converted to molten iron. Because the burden is a non-flowing material, chute 14 must be positionable to place burden where needed on surface 16 to ideally maintain the desired surface contour 16.

Chute 14 can be rotated about two axes. It is arranged to pivot about axle 26, pivotally coupled to the chute, in the direction indicated by double-ended arrow 28 (FIG. 1) by means of a suitable pivotal drive means 30 coupled to the chute. Chute 14 is also arranged to rotate about axis 34 normal to the axis of axle 26. As illustrated in FIG. 2, axle 26 and pivotal drive means 30 are secured to a ring 40. Ring 40 is rotationally positioned in a groove 42 of blast furnace 10 sidewalls 44. A rotational drive means 46 causes rotation of ring 40 and thus chute 14 about axis 34 in the directions indicated by double-ended arrows 50. Rotation is a full 360° at a constant rate.

An angular position indicating means 52 is coupled to drive means 46 for indicating the angular position Φ of chute 14. A second pivotal indicating position means 54 is coupled to drive means 30 for indicating the pivotal position θ of chute 14.

The description thus far of blast furnace 10 is that of a conventional blast furnace of the belless top type. The various components illustrated and described thus far are in mechanical schematic form for illustrating functionally what occurs in a blast furnace. It will be understood that the actual physical components will differ from those illustrated.

By proper orientation of chute 14 by drive means 30 and 46, burden 12 can be placed as desired on surface 16. Conventionally, this placement of burden is accomplished by rotating chute 14 about axis 34 at a relatively fast rate while pivoting the chute about axle 26 at a relatively slow rate, thereby causing the burden to be placed in a spiral pattern on surface 16.

It is desirable to maintain a fixed surface profile 16 at some predetermined height. However, due to uneven heating or furnace irregularities the burden moves non-uniformly down through blast furnace 10 creating an undesirable surface shape 16. If the height of the various parts of surface 16 above or below some arbitrary reference can be determined, chute 14 may be guided by means 30 and 46 to maintain the desired surface profile.

Measurement is accomplished by a radar scanning system comprising a ranging radar 62 of conventional design such as an FM-CW radar (see U.S. Pat. No. 4,072,947 issued Feb. 7, 1978 to H. C. Johnson) and a microwave reflector 64 secured to the undersurface of chute 14. Radar 62 is attached to a cylindrical pipe 66 which is in turn attached to wall 44. Reflector 64 may be shaped to direct a very narrow beam to surface 16. However, for practical purposes, a planar reflector 64 constructed of any suitable electrical conductor material such as steel or aluminum will provide acceptable performance at much lower manufacturing cost.

Radar 62 includes an antenna 68 fixed in position relative to blast furnace 10 and adapted to direct signals in the form of a narrow beam of microwave energy horizontally (e.g. parallel to floor 22) toward reflector 64 (beam portion 69, FIG. 1) and thence to surface 16 (beam portion 71, FIG. 1). A second wide beam receiving antenna (not shown) may be coupled to radar 62 forming with antenna 68 an antenna means which is positioned to receive directly the reflected microwave signals from surface 16. Alternately, and preferably, the microwave signals are reflected from surface 16 to reflector 64 thence to antenna 68 which is a combined transmitting-receiving antenna.

In conventional manner, ranging radar 62 computes a signal which is a measure of the round trip time of the microwave signals as a function of time from which range can be determined. If chute 14, and thus reflector 64, are stationary the round trip time for the microwave signals is fixed and thus a given range is computed. However, if chute 14, and thus reflector 64, are moved as above-described, different round trip signal times and therefore different ranges will be determined. The different round trip times and ranges occur both because the distance from radar antenna 68 to reflector 64 to surface 16 is a function of chute and reflector orientation and because surface 16 is typically not planar.

Depending on the limits of angular travel of reflector 64 and the distance from the reflector 64 to surface 16, radar 62 may not be able to "see" the complete surface 16. Therefore, it may be desirable to provide a second radar 72 (FIG. 1), similar to radar 62, and positioned 180° from radar 62. The second radar 72 may also be useful to provide a backup should radar 62 become defective.

Figure 3:
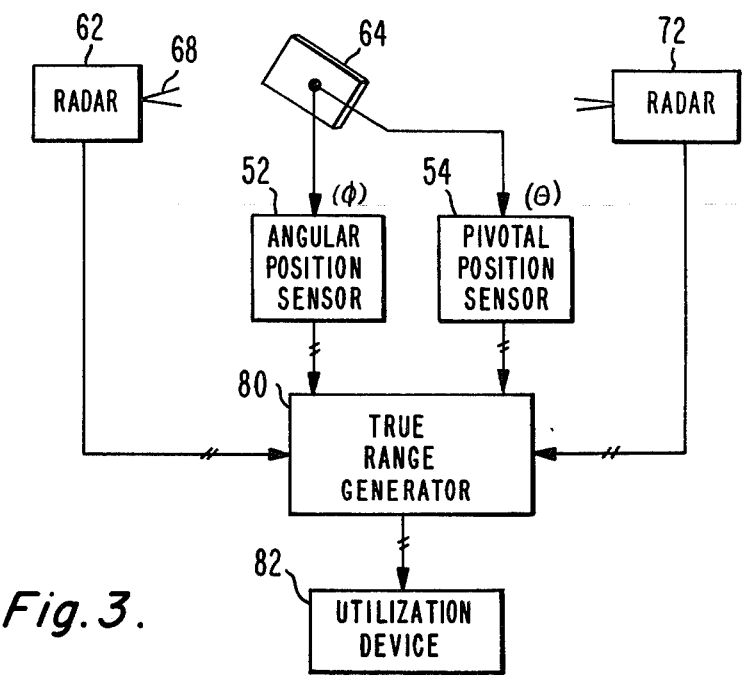
FIG. 3 is a scanning radar system in electronic schematic form for use in the height measuring application of FIGS. 1 and 2.

The electronic interconnection of the various parts of the scanning system is illustrated in FIG. 3 to which attention is now directed. Radar 62 and if present, radar 72 are connected via multiconductor cables to a true range generator 80 as are angular position sensor 52 and pivotal position sensor 54. The purpose of true range generator 80 is to compute the height at various points on burden surface 16 relative to some reference elevation such as the bottom of the furnace 10 or at the level of ring 40.

Generator 80 may be a dedicated piece of hardware, or alternatively, and preferably, may be a microprocessor which receives in real time chute 14 orientation information $\theta$ and $\Phi$ from sensors 52 and 54 and also, in real time, round trip time information from radar 62 or 72 depending on the position of chute 14.

The angle $\theta$, as illustrated in FIG. 1, is defined as the obtuse angle between a horizontal reference plane and the plane of reflector (64). The angle $\Phi$, as illustrated in FIG. 2, is defined as the angle between the antenna beam center (67) and the axis of axle 26 about axis 34. Angle $\Phi$ can take on values of 0° to 360°.

The measured angles $\theta$ and $\Phi$ (FIGS. 1 and 2) and the measured range R from radar antenna 66 to reflector 64 (from portion 69) thence from reflector 64 to burden surface 16 (beam portion 71) can be used with the following equations in generator 80 to determine the location, $x_0, y_0, z_0$, in rectangular coordinates, of the intersection between the reflected microwave beam (portion 71) and the burden surface 16:

$$z_0 = 2(R - R_k) \sin \theta \cos \theta \sin \Phi \quad (1)$$

$$x_0 = -z_0 \tan \theta \cos \Phi \quad (2)$$

$$y_0 = \frac{z_0 (1 - 2 \sin^2 \theta \sin^2 \phi)}{2 \sin \theta \cos \theta \sin \phi} \quad (3)$$

$x_0, y_0, z_0$ distances are referenced from the intersection of the center of the transmitted radar beam with the reflecting surface 64. The value of $R_k$ is a function of angle $\theta$.

Generator 80 is coupled to some utilization device 82 for further processing. Utilization device 82, may for example, be a plotting recorder which simply illustrates burden height as a function of position. Alternately, utilization device 82 may be adapted to operate drive means 30 and 46 to place burden only in low spots such as 60 on surface 16 (FIG. 1) to make the surface conform to the desired profile.

It will be realized that scanning by means of a reflector 64 has at least two advantages over the use of a scanning antenna to determine burden height. First, with a scanning antenna, during parts of its travel, the microwave signal may be blocked by chute 14 from passing between the radar antenna and surface 16. Second, movable antennas are substantially more subject to failure than is the chute 14 orientation mechanism, while, if the orientation mechanism fails, the blast furnace must be shut down for repairs. Also, the reflected radar beam in this configuration is never blocked by material flowing from the chute.

Operation of the radar scanning system is as follows. Chute 14 is arranged to pivot and rotate in a desired manner to trace a desired pattern over surface 16. If trap door 20 is open, burden 12 passes through floor 22 down chute 14 to surface 16. Concurrently, radar 62 or radar 72 determines a measure of the roundtrip time of signals from the radar to the reflector and to surface 16 and back to the radar. Generator 80, as a function of time, computes the true range of various points on surface 16 to some arbitrary level in blast furnace 10. Utilization device 82 may direct chute 14 to place the burden in low spots of surface 16.

It will, of course, be realized that the use of a microwave reflector for scanning has uses other than in a blast furnace. Surface 16 may be the surface of any object the range of which relative to some location is to be measured. Further, the term "object" as used herein and in the claims may in fact be a plurality of different objects at different distances. Additionally a speed sensing or range rate radar may be utilized in place of a ranging radar. With a range rate radar, generator 80 would simply produce signals indicative of speed of an object as a function of various points in space.

What is claimed is:

1. A radar scanning system for scanning an object, comprising in combination:
    radar system means including an antenna means for transmitting a first signal in the form of a nonscanning beam of a microwave energy and being receptive of said signal after being reflected from said object for producing a second signal indicative of the time difference between the transmission and return of said first signal, said radar means producing a succession of such first and second signals indicative of time difference as a function of time;
    a material directing chute;

a microwave reflector positioned on said material directing chute to reflect said signals from said radar means to said object;

means coupled to said chute and reflector for moving said chute and reflector to scan said object by said first signal in a desired pattern;

means responsive to the orientation of said reflector for producing a succession of third signals which are representative of the orientation of said reflector as a function of time; and means responsive to said second and third signals for producing a succession of fourth signals which represent one of range and range rate of said object as a function of reflector orientation.

2. The combination as set forth in claim 1 wherein said means for moving said microwave reflector includes means for pivoting said reflector about a first axis.

3. The combination as set forth in claim 2, wherein said means for moving said reflector further includes means for rotating said reflector about a second axis which is normal to said first axis.

4. A system for measuring height of various locations of a surface formed by a nonflowing material in a blast furnace comprising in combination:

a material directing chute positioned in said blast furnace and means for changing the orientation of said chute for distributing material therein over said surface, said surface being undesirably of non-uniform heighth in said blast furnace;

a reflector of microwave energy connected to said chute for movement therewith;

a ranging radar system means including nonscanning antenna means positioned to direct signals in the form of a beam of microwave energy to said reflector, thence as a function of orientation of said reflector to various locations on said surface as a function of time, said antenna means adapted to receive the signals reflected from said surface, said radar system means being operative for producing signals representing the round trip time of said beam signals from said antenna to said surface and back to said antenna;

means coupled to said chute and responsive to its orientation for producing signals indicative of orientation as a function of time; and means responsive to said round trip time signals and orientation indicative signals for determining the heighth of various locations on said surface.

* * * * *